UNITED STATES PATENT OFFICE.

WILLIAM E. ANDREW, OF NEW YORK, N. Y.

IMPROVEMENT IN PROCESSES FOR SEPARATING OLEOMARGARINE AND STEARINE FROM ANIMAL FAT.

Specification forming part of Letters Patent No. 153,999, dated August 11, 1874; application filed January 13, 1874.

*To all whom it may concern:*

Be it known that I, WM. E. ANDREW, of the city, county, and State of New York, have invented a new Process or Processes of Extracting Oleomargarine and Stearine from Animal Fat, of which the following is a specification:

This invention relates to certain improvements in processes employed for separating oleomargarine and stearine from animal fat for domestic purposes, whereby a saving of time, labor, and expense is effected, a better article is produced, and the risk of loss by the non-separation of the oleomargarine, stearine, and membrane, as well as other evil effects which result when water is used in the process, is avoided in the accomplishment of the desired object; and the invention consists in a peculiar method of subjecting the fat to heat and pressure at different temperatures, and extracting the desired products without the aid of water or chemicals, as will be hereinafter described.

In carrying out my invention, I take fresh animal fat and chop or hash it fine in a room at a comfortable temperature, which is generally sufficient to start the oil. After being chopped, as before mentioned, the fat is placed in suitable cloths or bags. The bags are placed in series, a little separated from each other, between metal plates, in a suitable press, and subjected to pressure. This press should be provided with a suitable jacket, by means of which the heat used in the process is confined to it and its contents. The temperature within the said jacket should be from 110° to 140° Fahrenheit, which is effected by the introduction of dry hot air in any convenient manner, so as to extract the oleomargarine and stearine from the membrane of the animal fat, which membrane remains in the press.

I have also discovered that if the animal fat remains heated any considerable time in a mass or body before the oleomargarine and stearine are separated from the membraneous matter, the butter produced from the oleomargarine so extracted will have a disagreeable animal odor or flavor, resulting from the cooking or decomposition of said membraneous or fibrous matter. I obviate this by expressing the oleomargarine and stearine from the mass as speedily as possible after it becomes sufficiently heated for that purpose, applying little heat until the mass, in separate parcels, as aforesaid, has been placed in the press, and then pressing out the oily matter before the animal fiber has had time to become partially cooked or decomposed. To facilitate the speedy uniform heating of the mass in the press, I so place the separate parcels in bags or cloths, as aforesaid, that the heated air will circulate freely between or among them. The oleomargarine and stearine thus extracted are conveyed away immediately, as fast as rendered, through suitable carriers or troughs, to a cool apartment, where it becomes a thick mass.

Thus, it will be observed, the oleomargarine and stearine are subjected to heat only sufficiently long to convert the same into a state approximating so nearly to liquid that it will run over an inclined surface in the heated apartment. After cooling, the mass is then placed in cloths or bags and again subjected to pressure, as before, except that the temperature is reduced to about 85° Fahrenheit. This latter pressure, at the reduced temperature, has for its object the separation of the oleomargarine from the solid stearine, (which is readily effected at about 85°, the membrane having been eliminated by the previous pressure,) leaving the stearine in the press, the oil passing off, and thus being ready for use for any desired purpose.

Thus, as is obvious, each element of the animal fat is effectually separated from the others without the aid of water or chemicals of any description, with all deleterious matter eliminated, and the oleomargarine, which is the valuable product sought, may be made into butter by the usual method of intermixing and churning with milk.

After many experiments I have discovered that a free and perfect separation of the oleomargarine and stearine from the membrane, and without animal odor or flavor, can be obtained from the fat taken before it has lost any great degree of animal heat, or become tallowed or set. Experience has demonstrated that the fat is in a better condition for allowing the separation of the oleomargarine and stearine from the membrane while in this condition, and that the result is not deleteriously affected in odor or flavor. The heat of the fat should then be increased to, say, from 100° to 130°, by the application of dry heat in any suitable manner, as before mentioned, and immediately subjected to pressure.

It has been discovered that the application of water or steam or other moisture to the fat while in process of rendition, as formerly practiced, is highly injurious to the product of oleomargarine—especially so when the oleomargarine is to be used in the manufacture of butter, as it renders the butter liable to granulate and crumble. And in any event, when water is used, there is much trouble and expense necessary in separating the water from the mass, as is obvious.

The product of the first pressure, which is the oleomargarine with a large percentage of stearine, is suitable for the manufacture of butter for use in warmer climates, as it will be of a harder and firmer nature, and not so susceptible to the effects of heat.

I do not claim, broadly, the separation of oleomargarine from animal fat, or the product obtained by separating membrane from animal fat at a low temperature; nor do I claim the separation of the oleomargarine without the use of water or chemicals, broadly; but What I do claim is—

1. The within-described process of separating the oleomargarine and stearine from the membrane of animal fat, consisting of subjecting the fat to pressure when raised to a temperature sufficient to effect the separation, and conveying the oily product away from the heat to a cooler place as rapidly as expressed, without the use of water or chemicals, as specified, and for the purpose set forth.

2. The process consisting of subjecting the oleomargarine and stearine, procured as described, to a pressure at a reduced temperature, whereby the oleomargarine is separated from the stearine, as specified, without the use of water or chemicals.

3. In extracting oleomargarine from animal fat, for food or culinary purposes, the process of separating the oleomargarine and stearine from the membrane by taking the fat while retaining its animal heat and raising it to the proper temperature by the application of dry heat, and subjecting it to pressure as soon as sufficiently heated, thus separating the oleomargarine and stearine from the membrane without the use of chemicals or water, as described.

WILLIAM E. ANDREW.

Witnesses:
    THOS. ROBJOHN,
    HENRY T. BROWN.